(12) United States Patent
Cheon et al.

(10) Patent No.: US 8,421,369 B2
(45) Date of Patent: Apr. 16, 2013

(54) LIGHT EMITTING DIODE HAVING PROTECTION FUNCTION

(75) Inventors: Jeong In Cheon, Seoul (KR); Byoung Own Min, Gyunggi-do (KR); Yu Jin Jang, Gyunggi-do (KR); Seung Kon Kong, Gyunggi-do (KR)

(73) Assignee: Samsung Electro-Mechanics Co., Ltd. (KR)

( * ) Notice: Subject to any disclaimer, the term of this patent is extended or adjusted under 35 U.S.C. 154(b) by 683 days.

(21) Appl. No.: 12/606,800

(22) Filed: Oct. 27, 2009

(65) Prior Publication Data

US 2010/0102750 A1   Apr. 29, 2010

(30) Foreign Application Priority Data

Oct. 28, 2008   (KR) .................. 10-2008-0106186

(51) Int. Cl.
*H05B 37/02*   (2006.01)
(52) U.S. Cl.
USPC ............................ 315/291; 315/307; 315/308
(58) Field of Classification Search .......... 315/291–311, 315/209 R, 224–226, 278, 276
See application file for complete search history.

(56) References Cited

U.S. PATENT DOCUMENTS

| | | | | |
|---|---|---|---|---|
| 6,411,483 B1* | 6/2002 | Sarles et al. | ................. | 361/93.4 |
| 6,548,992 B1* | 4/2003 | Alcantar et al. | ............. | 323/285 |
| 6,680,837 B1* | 1/2004 | Buxton | ......................... | 361/93.9 |
| 6,819,063 B2* | 11/2004 | Nemirow | ....................... | 315/308 |
| 8,031,494 B2* | 10/2011 | Brkovic | .......................... | 363/49 |
| 2008/0012507 A1* | 1/2008 | Nalbant | ......................... | 315/306 |
| 2008/0129265 A1* | 6/2008 | Rosenthal | ..................... | 323/283 |
| 2010/0090618 A1* | 4/2010 | Veltman | ....................... | 315/307 |

FOREIGN PATENT DOCUMENTS

KR   1020020043345 A   6/2002

* cited by examiner

*Primary Examiner* — Douglas W Owens
*Assistant Examiner* — Amy Yang
(74) *Attorney, Agent, or Firm* — Lowe Hauptman Ham & Berner, LLP

(57) ABSTRACT

The present invention relates to a light emitting diode driver having a protection function that activates hiccup mode for a predetermined period of time when a light emitting diode performs an abnormal operation to thereby protect the light emitting diode. A light emitting diode driver having a protection function according to an aspect of the invention may include: a light emitting unit emitting light; a reference signal generating unit generating a reference signal having pulses with a predetermined period when the light emitting unit performs an abnormal operation; a control unit controlling operating time in hiccup mode according to the reference signal from the reference signal generating unit, the hiccup mode where output is switched on and off at a predetermined period; and a driving unit driving the light emitting unit in the hiccup mode for the operating time determined by the control unit.

12 Claims, 5 Drawing Sheets

LIGHT EMITTING DIODE HAVING PROTECTION FUNCTION

CROSS-REFERENCE TO RELATED APPLICATIONS

This application claims the priority of Korean Patent Application No. 10-2008-0106186 filed on Oct. 28, 2008, in the Korean Intellectual Property Office, the disclosure of which is incorporated herein by reference.

BACKGROUND OF THE INVENTION

1. Field of the Invention

The present invention relates to light emitting diode drivers, and more particularly, to a light emitting diode driver having a protection function that activates hiccup mode for a predetermined period of time when a light emitting diode performs an abnormal operation to thereby protect the light emitting diode.

2. Description of the Related Art

In general, liquid crystal displays (LCDs) include backlight units that employ cold cathode fluorescent lamps (CCFLs) as light sources. However, CCFLs may cause environmental pollution since they use mercury gas, have low response speeds, and low color reproducibility. Besides, CCFLs make it difficult to reduce the weight, thickness, and size of LCD panels.

Therefore, light emitting diodes (LEDs) have currently been positively used in display devices. When compared to CCFLs, LEDs are environment friendly, have a high response speed of several nano seconds, are effective for video signal streams, can be impulsively driven and have a color reproducibility of 100% or more. Furthermore, the brightness and color temperature of LEDs can be varied by controlling the amount of light emitted from red, green, and blue LEDs, and LEDs make it possible to reduce the weight, thickness, and size of LCD panels.

It is necessary for backlight units having these LEDs to use LED drivers that supply electrical currents to the LEDs to drive them.

LED drivers initiate latch mode when abnormal voltage or an abnormal current is applied to the LEDs, so that the LED drivers maintain latch-off mode when power is not physically reset without any time to return to a normal state.

SUMMARY OF THE INVENTION

An aspect of the present invention provides a light emitting diode driver having a protection function that activates hiccup mode for a predetermined period of time when a light emitting diode performs an abnormal operation to thereby protect the light emitting diode.

According to an aspect of the present invention a light emitting diode driver having a protection function, the light emitting diode driver including: a reference signal generating unit generating a reference signal having pulses with a predetermined period when a light emitting unit for emitting light performs an abnormal operation; a control unit controlling operating time in hiccup mode according to the reference signal from the reference signal generating unit, the hiccup mode where output is switched on and off at a predetermined period; and a driving unit driving the light emitting unit in the hiccup mode for the operating time determined by the control unit.

The control unit may include: a counter counting the number of pulses of the reference signal; an enable coder coding the counted number of pulses and a predetermined number to compare a difference therebetween; and a controller shutting down operations of the light emitting diode driver when the counted number of pulses is equal to the predetermined number or controlling the driving unit in hiccup mode when the counted number of pulses is not equal to the predetermined number.

The driving unit may include a first logic circuit having a set terminal receiving abnormal voltage or an abnormal current from the light emitting unit, a reset terminal receiving a pulse signal from the control unit, and output terminals outputting a driving signal for driving the light emitting unit and a switching signal for switching a charging and discharging path of the reference signal generating unit by performing logic operations on signals from the set terminal and the reset terminal.

The light emitting diode driver may further include a mode setting unit selecting hiccup mode operation when the light emitting unit performs an abnormal operation.

The mode setting unit may include: a first switch switched off when the hiccup mode is selected; a second switch switched off when the switching signal from the driving unit has a low level; a capacitor charging and discharging a predetermined current; a third switch switching on a transmission path of the current when the hiccup mode is selected; and a fourth switch switching on the transmission path of the current when the switching signal from the driving unit has a high level.

The reference signal generating unit may include: a first current source supplying a charging current to the capacitor; a second current source discharging the current charged in the capacitor; first and second comparators comparing voltage levels of the current charged in and discharged from the capacitor and predetermined voltage levels of first and second reference voltages, respectively, a second logic circuit having a set terminal receiving a comparison result from the first comparator, a reset terminal receiving a comparison result from the second comparator, and output terminals performing a logic operation of the received comparison results to output operation results; a fifth switch opening or closing a path of the current to be charged in the capacitor according to an output signal from the second logic circuit; and a sixth switch opening or closing a path of the current to be discharged from the capacitor according to an output signal from the second logic circuit.

The light emitting unit may include at least one light emitting diode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
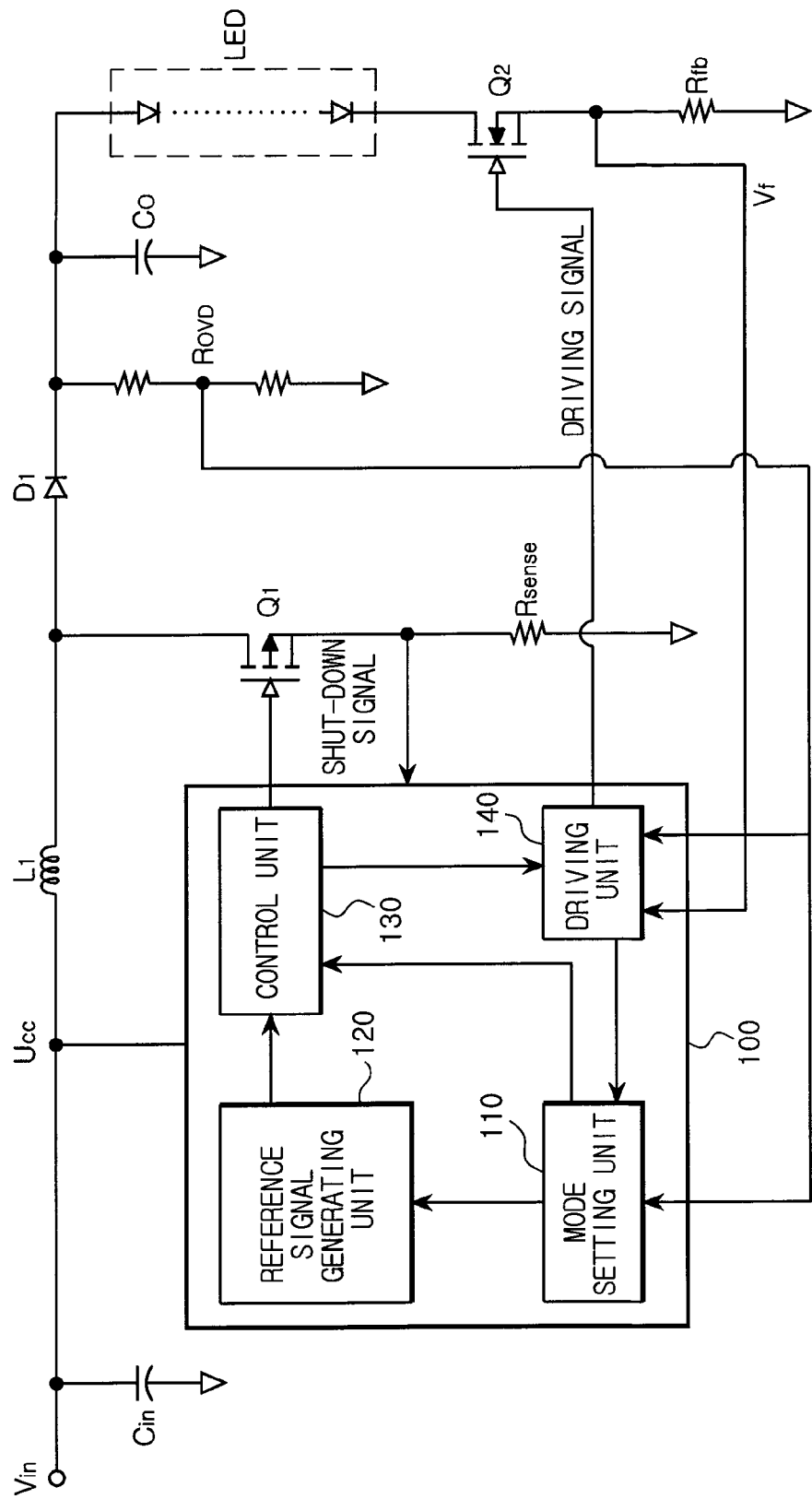
FIG. 1 is a backlight unit employing a light emitting diode driver according to an exemplary embodiment of the present invention.

FIG. 1 is a backlight unit that employs a light emitting diode driver according to an exemplary embodiment of the invention.

Referring to FIG. 1, a backlight unit employs a light emitting diode driver 100 according to this embodiment to drive at least one light emitting diode LED.

The light emitting diode driver 100 may include a mode setting unit 110, a reference signal generating unit 120, a control unit 130, and a driving unit 140.

The mode setting unit 110 may set hiccup mode operation according to a user's selection when a detection voltage or a detection current from a light emitting unit including at least one light emitting diode (LED) corresponds to an abnormal operation.

The reference signal generating unit 120 charges or discharges a predetermined amount of current to generate a reference signal when the mode setting unit 110 sets hiccup mode.

The control unit 130 controls the operating time in hiccup mode according to the reference signal from the reference signal generating unit 120, so that the hiccup mode is maintained for the operating time. If the light emitting diode is still performing an abnormal operation even after the operating time is up, the control unit 130 shuts down the operations of the light emitting diode driver. Alternatively, the control unit 130 may entirely shut down the operations of the backlight unit.

The driving unit 140 performs the hiccup mode operation during the hiccup mode operating time under the control of the control unit 130, such that the power supply to the light emitting diode LED is repeatedly switched on and off at predetermined periods.

Components of the above-described light emitting diode driver according to the embodiment of the invention will now be described in more detail with reference to the accompanying drawings.

Figure 2:
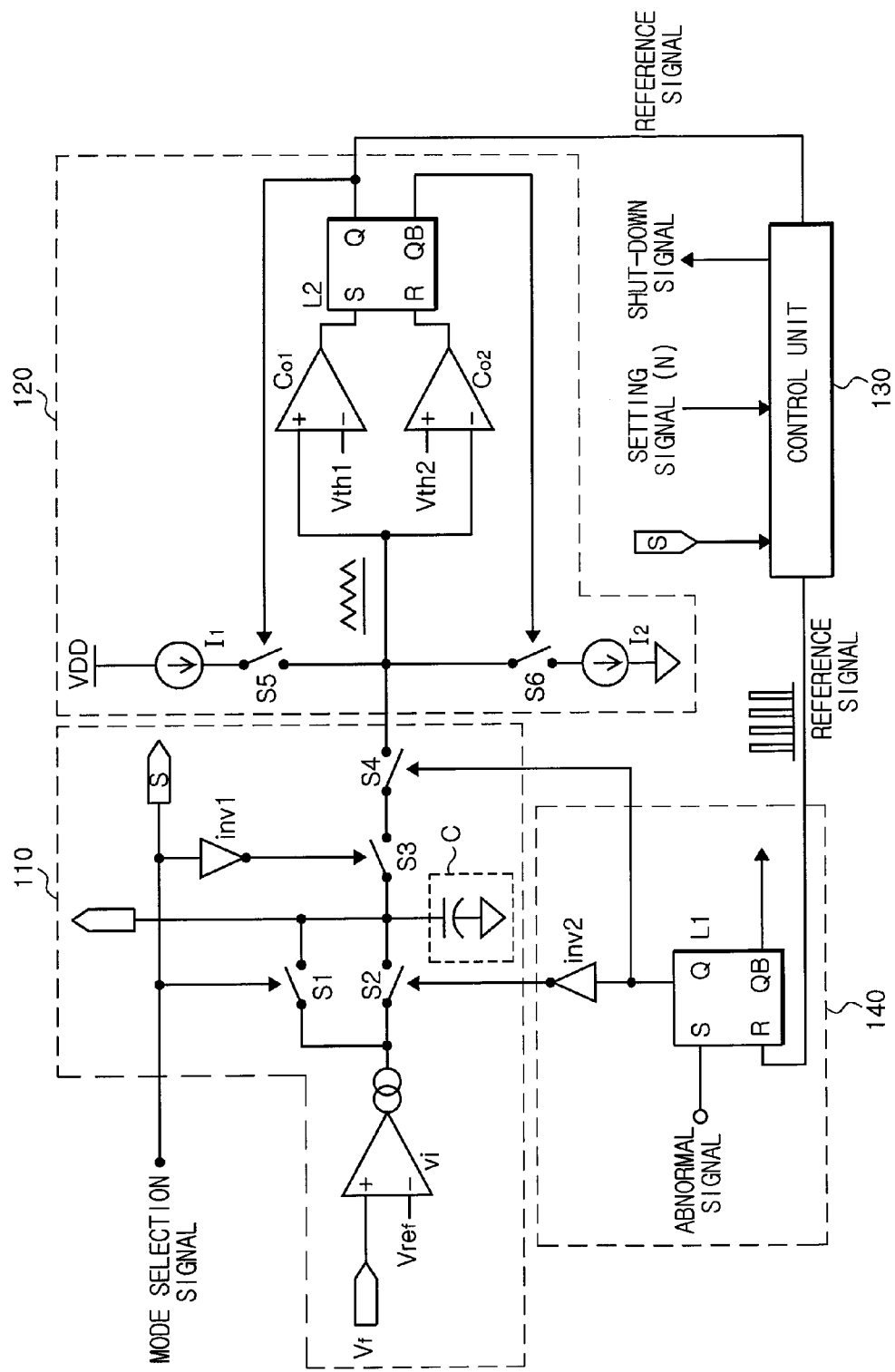
FIG. 2 is a detailed block diagram illustrating a light emitting diode driver according to an exemplary embodiment of the present invention.

FIG. 2 is a detailed block diagram illustrating a light emitting diode driver according to an exemplary embodiment of the invention.

Referring to FIGS. 1 and 2, the mode setting unit 110 includes a current-to-voltage converter vi, first to fourth switches S1 to S4, a first inverter inv1, and a capacitor C.

The current-to-voltage converter vi supplies to the capacitor C, the current corresponding to the difference between a detection voltage Vf, obtained by detecting the current flowing through the light emitting diode LED, and a reference voltage Vref having a predetermined voltage level. The capacitor C charges or discharges the current to supply a voltage generated by charging or discharging current in or from an external circuit.

Here, when the light emitting diode LED performs an abnormal operation, if a user selects hiccup mode, a low-level signal is transmitted to the first switch S1, which is then switched off to thereby close a current transmission path from the current-to-voltage converter vi. Further, the first inverter inv1 inverts a signal level of the low-level signal, which is then transmitted to the third switch S3. The third switch S3 is switched on, thereby opening another current transmission path. Each of the second and fourth switches S2 and S4 is switched on or off according to a switching signal from the driving unit 140 to thereby open or close a current transmission path. The driving unit 140 uses a first logic circuit L1 to output a switching signal having a high level according to the reference signal. A second inverter inv2 inverts the level of the switching signal, which is then transmitted to the second switch S2 to thereby switch off the second switch S2. The high-level switching signal is directly transmitted to the switch S4 to thereby switch on the fourth switch S4. The third switch S3 and the fourth switch S4 connect the current transmission path. The configuration and operation of the driving unit 140 will be described below in more detail.

The reference signal generating unit 120 includes first and second current sources I1 and I2, first and second comparators Co1 and Co2, a second logic circuit L2, and fifth and sixth switches S5 and S6.

The first current source I1 supplies a charging current to the capacitor C through the current transmission path that is formed by the third and fourth switches S3 and S4. The second current source I2 discharges the current that has been charged in the capacitor C.

The voltage has a triangular wave by charging and discharging the current in and from the capacitor C. The voltage is transmitted to each of the first and second comparators Co1 and Co2. Each of the first and second comparators Co1 and Co2 compare the voltage level of the voltage from the capacitor C and each of the predetermined voltage levels of first and second reference voltages Vth1 and Vth2.

Comparison results are transmitted to the second logic circuit L2. The second logic circuit L2 may include an RS latch that has a set terminal, a reset terminal and first and second output terminals Q and QB. Here, the comparison result from the comparator Co1 is transmitted to the set terminal, the comparison result from the comparator Co2 is transmitted to the reset terminal, and the first and second output terminals Q and QB perform logic operations using the comparison results to generate output signals to control the switching on and off of the fifth and sixth switches S5 and S6.

The fifth and sixth switches S5 and S6 are alternately switched on and off to charge and discharge the capacitor C. An output signal from the first terminal Q may have a signal level that is inverted to that of the output signal from the second output terminal QB.

The output signal from the first terminal Q may be transmitted to the control unit 130 as the reference signal. Then, the control unit 130 may buffer the reference signal, which is then transmitted to the driving unit 140.

Figure 3:
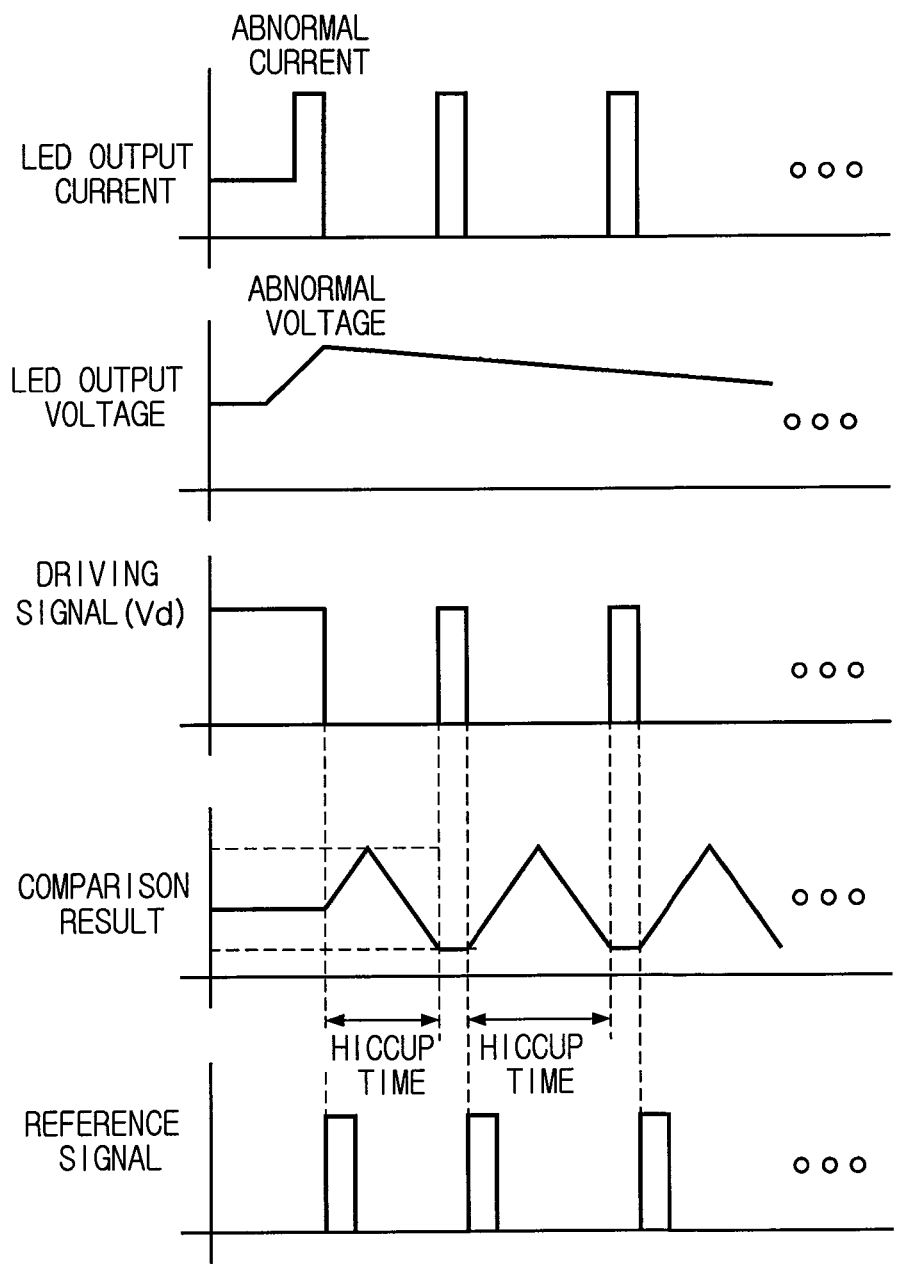
FIG. 3 is a timing chart illustrating a light emitting diode driver according to an exemplary embodiment of the present invention.

FIG. 3 is a timing chart illustrating a light emitting diode driver according to an exemplary embodiment of the invention.

Referring to FIGS. 2 and 3, as the light emitting diode driver 100 has been described, when an abnormal voltage or an abnormal current is detected due to the abnormal operation of the light emitting diode LED, if hiccup mode is selected, a comparison result between the voltage levels of the first and second reference voltages is shown in FIG. 3. Therefore, the reference signal has pulses on rising edges of the comparison result.

A time over one pulse period of the reference signal is determined by Equation 1 as follows.

$$T_{hiccup} = C_{comp} \times \left( \frac{V_{th2} - V_{comp}}{I_{source}} + \frac{V_{th2} - V_{th1}}{I_{sink}} \right) \quad \text{[Equation 1]}$$

Here, $T_{hiccup}$ is hiccup mode time, $C_{comp}$ is the capacitance of the capacitor C, $V_{th1}$, $V_{th2}$ are voltage levels of the first and second reference voltages Vth1 and Vth2, respectively, $V_{comp}$ is a voltage level of the voltage charged in the capacitor C, and $I_{source}$ and $I_{sink}$ are current levels of the first and second current sources I1 and I2, respectively.

As shown in FIG. 3, during one pulse period of the reference signal, a driving signal Vd from the driving unit 140 is switched on for a period of time obtained by subtracting a hiccup mode time from the time over one pulse period to thereby supply the power to the light emitting diode LED.

The reference signal is transmitted to the control unit 130.

When hiccup mode is selected, the control unit 130 is input with a set time from the outside and terminates hiccup mode when the set time comes. The control unit 130 controls so that the light emitting diode driver 100 or the backlight unit, shown in FIG. 1, operates in a normal state or shuts down operations of the light emitting diode driver 100 or the backlight unit according to whether the light emitting diode LED performs an abnormal operation or not. The reference signal is transmitted to the driving unit 140 through the control unit 130. The above-described control unit 130 will be described in detail with reference to FIG. 4.

The driving unit 140 includes the first logic circuit L1. Here, the first logic circuit L1 includes the RS latch that has the set terminal, the reset terminal and the first and second output terminals Q and QB. The set terminal receives a detection result of detecting abnormal voltage or an abnormal current of the light emitting diode LED. The reference signal is transmitted to the reset terminal. The first and second output terminals Q and QB each perform a logic operation of the detection result and the reference signal to output the switching signal for controlling the switching on/off of each of the second and fourth switches S2 and S4 and the driving signal for driving a switch Q2 of the backlight unit. The second inverter inv2 inverts the signal level of the switching signal, which is then transmitted to the second switch S2.

Figure 4:
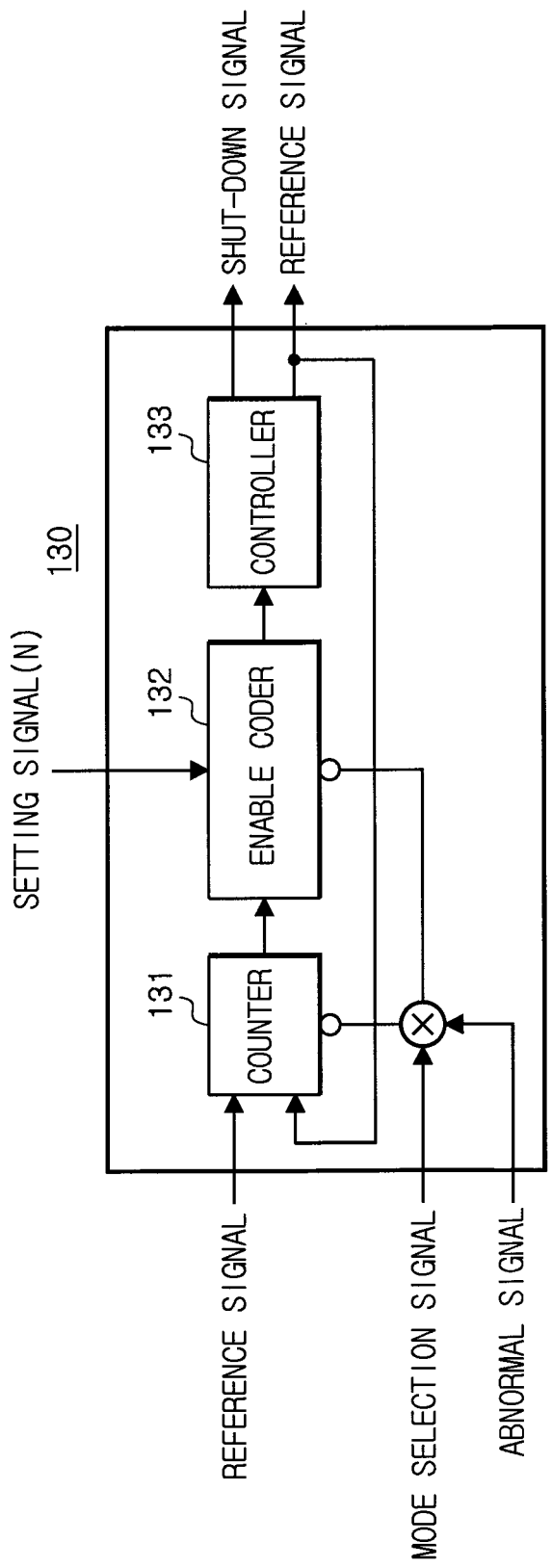
FIG. 4 is a detailed block diagram illustrating a control unit that is employed in a light emitting diode driver according to an exemplary embodiment of the present invention.

FIG. 4 is a detailed block diagram illustrating a control unit that is employed in a light emitting diode driver according to an exemplary embodiment of the invention.

Referring to FIG. 4, the control unit 130 of the light emitting diode driver 100 according to this embodiment includes a counter 131, an enable coder 132, and a controller 133.

The counter 131 counts the number of pulses of the reference signal. The counted number is transmitted to the enable coder 132. The counter 131 and the enable coder 132 operate when hiccup mode is selected and the light emitting diode performs an abnormal operation.

The enable coder 132 codes a setting signal from the outside and the counting result to compare the difference therebetween. The setting signal may be the number of pulses that have been previously determined. For example, when the number of pulses of the reference signal is 16, it is possible to determine the termination of hiccup mode.

That is, the total amount of time in hiccup mode can be obtained by Equation 2, where the above-described Equation 1 is multiplied by the number of pulses of a setting signal N.

$$T_{hiccup} = C_{comp} \times \left( \frac{V_{th2} - V_{comp}}{I_{source}} + \frac{V_{th2} - V_{th1}}{I_{sink}} \right) \times N \quad \text{Equation 2}$$

Here, N is the number of pulses.

When the coding result is equal to the predetermined number, the controller 133 controls so that the hiccup mode operation is terminated. At this time, when the light emitting diode LED is performing an abnormal operation, the controller 133 outputs a shut-down signal.

Figure 5:
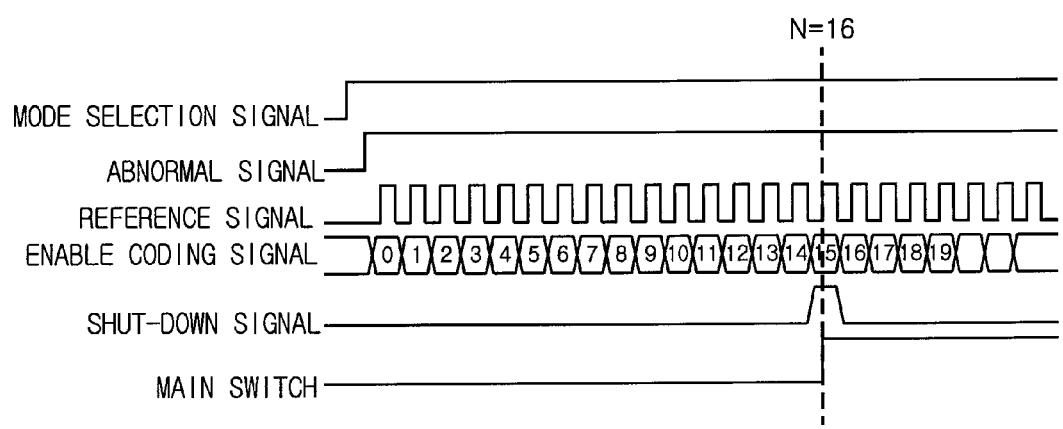
FIG. 5 is a timing chart illustrating a control unit that is employed in a light emitting diode driver according to an exemplary embodiment of the present invention.

FIG. 5 is a timing chart illustrating a control unit that is employed in a light emitting diode driver according to an exemplary embodiment of the invention.

Referring to FIGS. 4 and 5, when hiccup mode is selected, if the light emitting diode performs an abnormal operation, the control unit 130 performs hiccup mode operation until the number of pulses of the reference signal becomes 16. When the number of pulses of the reference signal becomes 16, if the light emitting diode is performing an abnormal operation, the control unit outputs a shut-down signal to switch off a main switch Q1.

As described above, the light emitting diode driver according to the embodiment of the invention is provided in the backlight unit to set operating time in hiccup mode, thereby preventing the abnormal operation of the light emitting diode and protecting the backlight unit.

As set forth above, according to exemplary embodiments of the invention, hiccup mode is maintained for a period of time determined by a user's selection when a light emitting diode performs an abnormal operation, so that the desired amount of power is supplied to the light emitting diode to thereby protect the light emitting diode.

While the present invention has been shown and described in connection with the exemplary embodiments, it will be apparent to those skilled in the art that modifications and variations can be made without departing from the spirit and scope of the invention as defined by the appended claims.

What is claimed is:

1. A lighting driver having a protection function, the lighting driver comprising:
   a reference signal generating unit configured to generate a reference signal having pulses with a predetermined period when a lighting unit performs an abnormal operation;
   a control unit configured to control operating time in a hiccup mode according to the reference signal from the reference signal generating unit, wherein the hiccup mode is an operation mode where an output of the lighting driver is switched on and off at a predetermined period; and
   a driving unit configured to drive the lighting unit in the hiccup mode for the operating time determined by the control unit, wherein
   the control unit comprises:
     a counter configured to count a number of pulses of the reference signal;
     an enable coder configured to code the counted number of pulses and a predetermined number to compare a difference therebetween; and
     a controller configured to shut down the lighting driver when the counted number of pulses is equal to the predetermined number or to control the driving unit in the hiccup mode when the counted number of pulses is not equal to the predetermined number.

2. The lighting driver of claim 1, wherein the driving unit comprises a first logic circuit having a set terminal for receiving an abnormal voltage or an abnormal current from the lighting unit, a reset terminal for receiving a pulse signal from the control unit, and output terminals for outputting a driving signal for driving the lighting unit and a switching signal for switching a charging and discharging path of the reference signal generating unit by performing a logical operation on signals from the set terminal and the reset terminal.

3. The lighting driver of claim 2, further comprising a mode setting unit configured to select the hiccup mode when the lighting unit performs an abnormal operation.

4. The light emitting diode lighting driver of claim 3, wherein the mode setting unit comprises:
   a first switch configured to be switched off when the hiccup mode is selected;
   a second switch configured to be switched off when the switching signal from the driving unit has a low level;
   a capacitor configured to charge and discharge a predetermined current;
   a third switch configured to switch on a transmission path of the predetermined current when the hiccup mode is selected; and
   a fourth switch configured to switch on the transmission path of the predetermined current when the switching signal from the driving unit has a high level.

5. The lighting driver of claim 4, wherein the reference signal generating unit comprises:
   a first current source configured to supply a charging current to the capacitor;
   a second current source configured to discharge a current charged in the capacitor;
   first and second comparators, the first comparator configured to compare a voltage obtained by charging and discharging of the capacitor with a first reference voltage and the second comparator configured to compare the voltage obtained by charging and discharging of the capacitor with a second reference voltage;
   a second logic circuit having a set terminal for receiving a comparison result from the first comparator, a reset terminal for receiving a comparison result from the second comparator, and output terminals for performing a logical operation on the received comparison results;
   a fifth switch configured to switch on or off a path of a current to be charged in the capacitor according to an output signal from the second logic circuit; and
   a sixth switch configured to switch on or off a path of a current to be discharged from the capacitor according to the output signal from the second logic circuit.

6. The lighting driver of claim 5, wherein the lighting unit comprises at least one light emitting diode.

7. A backlight unit, comprising:
   a lighting unit; and
   a lighting driver for driving the lighting unit, the lighting driver having a protection function, wherein
   the lighting driver comprises:
      a reference signal generating unit configured to generate a reference signal having pulses with a predetermined period when the lighting unit performs an abnormal operation;
      a control unit configured to control operating time in a hiccup mode according to the reference signal from the reference signal generating unit, the hiccup mode where an output of the lighting driver is switched on and off at a predetermined period; and
      a driving unit configured to drive the lighting unit in the hiccup mode for the operating time determined by the control unit, and the control unit comprises:
   a counter configured to count a number of pulses of the reference signal;
   an enable coder configured to code the counted number of pulses and a predetermined number to compare a difference therebetween; and
   a controller configured to shut down the lighting driver or the backlight unit when the counted number of pulses is equal to the predetermined number or to control the driving unit in the hiccup mode when the counted number of pulses is not equal to the predetermined number.

8. The backlight unit of claim 7, wherein the driving unit comprises a first logic circuit having a set terminal for receiving an abnormal voltage or an abnormal current from the lighting unit, a reset terminal for receiving a pulse signal from the control unit, and output terminals for outputting a driving signal for driving the lighting unit and a switching signal for switching a charging and discharging path of the reference signal generating unit by performing a logical operation on signals from the set terminal and the reset terminal.

9. The backlight unit of claim 8, wherein the lighting driver further comprises a mode setting unit configured to select the hiccup mode when the lighting unit performs an abnormal operation.

10. The backlight unit of claim 9, wherein the mode setting unit comprises:
   a first switch configured to be switched off when the hiccup mode is selected;
   a second switch configured to be switched off when the switching signal from the driving unit has a low level;
   a capacitor for charging and discharging a predetermined current;
   a third switch configured to switch on a transmission path of the predetermined current when the hiccup mode is selected; and
   a fourth switch configured to switch on the transmission path of the predetermined current when the switching signal from the driving unit has a high level.

11. The backlight unit of claim 10, wherein the reference signal generating unit comprises:
   a first current source configured to supply a charging current to the capacitor;
   a second current source configured to discharge the current charged in the capacitor;
   first and second comparators configured to compare a voltage level of a voltage obtained by charging and discharging of the capacitor and predetermined voltage levels of first and second reference voltages, respectively;
   a second logic circuit having a set terminal for receiving a comparison result from the first comparator, a reset terminal for receiving a comparison result from the second comparator, and output terminals for performing a logical operation on the received comparison results;
   a fifth switch configured to switch on or off a path of the current to be charged in the capacitor according to an output signal from the second logic circuit; and
   a sixth switch configured to switch on or off a path of the current to be discharged from the capacitor according to the output signal from the second logic circuit.

12. The backlight unit of claim 7, wherein the lighting unit comprises at least one light emitting diode.

* * * * *